US007127492B1

(12) United States Patent
Calo et al.

(10) Patent No.: US 7,127,492 B1
(45) Date of Patent: Oct. 24, 2006

(54) METHOD AND APPARATUS FOR DISTRIBUTED APPLICATION ACCELERATION

(75) Inventors: Seraphin Bernard Calo, Cortlandt Manor, NY (US); Richard Orville LaMaire, Yorktown Heights, NY (US); Ashish Mehra, Mountain View, CA (US); Anees Abdul Shaikh, Yorktown Heights, NY (US); Renu Tewari, San Jose, CA (US); Dinesh Chandra Verma, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 09/702,927

(22) Filed: Oct. 31, 2000

(51) Int. Cl.
*G06F 15/167* (2006.01)

(52) U.S. Cl. ...................................... 709/214; 709/213

(58) Field of Classification Search ................ 709/217, 709/219, 227, 213, 214, 201, 202, 203, 245; 711/117, 118, 119; 717/168, 169, 176, 171, 717/172, 173; 707/10, 104
See application file for complete search history.

(56) References Cited

U.S. PATENT DOCUMENTS

| 6,112,228 | A  | * | 8/2000  | Earl et al. ................... 709/203 |
| 6,212,560 | B1 | * | 4/2001  | Fairchild .................... 709/221 |
| 6,230,160 | B1 | * | 5/2001  | Chan et al. .................. 707/102 |
| 6,272,536 | B1 | * | 8/2001  | van Hoff et al. ............ 709/217 |
| 6,341,311 | B1 | * | 1/2002  | Smith et al. ................ 709/226 |
| 6,385,661 | B1 | * | 5/2002  | Guthrie et al. .............. 709/203 |
| 6,484,143 | B1 | * | 11/2002 | Swildens et al. ............. 705/1 |
| 6,493,748 | B1 | * | 12/2002 | Nakayama et al. ......... 709/218 |
| 6,513,061 | B1 | * | 1/2003  | Ebata et al. ................ 709/201 |
| 6,591,266 | B1 | * | 7/2003  | Li et al. ........................ 707/10 |
| 6,601,090 | B1 | * | 7/2003  | Gurijala et al. ............. 709/213 |
| 6,615,258 | B1 | * | 9/2003  | Barry et al. ................. 709/223 |
| 6,697,849 | B1 | * | 2/2004  | Carlson ....................... 709/203 |
| 6,757,708 | B1 | * | 6/2004  | Craig et al. ................. 709/203 |
| 6,782,527 | B1 | * | 8/2004  | Kouznetsov et al. ........ 709/201 |
| 6,789,126 | B1 | * | 9/2004  | Saulpaugh et al. ......... 709/201 |
| 6,826,626 | B1 | * | 11/2004 | McManus .................... 709/246 |
| 6,836,889 | B1 | * | 12/2004 | Chan et al. .................. 719/310 |
| 6,879,995 | B1 | * | 4/2005  | Chinta et al. ............... 709/204 |
| 6,922,685 | B1 | * | 7/2005  | Greene et al. ................. 707/1 |

OTHER PUBLICATIONS

McGraw-Hill Publishing; "Encyclopedia of Networking", ISBN 0-07-882333-1, pp. 557-561, 1998.*
Java 2 Platform Enterprise Edition Specification, v1.2; Sun Microsystems, 1999.*

* cited by examiner

*Primary Examiner*—William Vaughn
*Assistant Examiner*—Yemane M. Gerezgiher
(74) *Attorney, Agent, or Firm*—Lisa M. Yamonaco; David Aker

(57) ABSTRACT

The present invention presents methods and apparatus supporting acceleration of networked applications by means of dynamic distributed execution and maintenance. It also enables management and administration of the distributed components of the networked applications from a responsible point of origination. The method and apparatus deploys a plurality of proxy servers within the network. Clients are directed to one of the proxy servers using wide area load balancing techniques. The proxy servers download programs from backend servers and cache them in a local store. These programs, in conjunction with data stored at cached servers, are used to execute applications at the proxy server, eliminating the need for a client to communicate to a backend server to execute a networked application.

45 Claims, 8 Drawing Sheets

METHOD AND APPARATUS FOR DISTRIBUTED APPLICATION ACCELERATION

FIELD OF THE INVENTION

The present application relates to the field of computer networks and distributed applications. It is more particularly directed to applications that are operational on the Internet using a system of Web-browsers and Web-servers.

BACKGROUND OF THE INVENTION

Currently, access over the Internet to Web-based applications is provided by having a Web-browser connect directly over a network of routers to a Web-server that maintains static content in data files, and composes dynamic content by executing programs, typically cgi-bin scripts or Java servlets. However, during periods of congestion due to traffic patterns on the Internet, this arrangement results in poor response times for the end client. The situation is typically worse the farther the client is located from the Web-server and the greater the number of intermediary routers involved in the network connection.

One way to improve application response time, reliability, and availability is to distribute the applications to proxy servers located closer to the client browsers. Distribution of content is used to improve the performance of the network by means of proxies within the network that cache pages.

The simple caching approach works well for data that is static and unchanging, e.g. images, video clips, etc. A proxy server is deployed within the network in many different ways. Some of the common ways include using a proxy server as a reverse proxy, where the proxy server is located closer to the web-server it is proxying for; as a forward proxy, where the proxy server is located closer to the browser or the client applications; or is as other auxiliary servers which may be located elsewhere within the network. The proxy server usually provides information to the browser on behalf of a backend server. The browser may contact the proxy server due to a variety of reasons e.g., because it has been explicitly configured to do so, or because the domain name server gives it the location of a proxy server instead of the backend web-server, or because a network operator or backend web-server operator has configured the network to send requests from the browser to the proxy server in a transparent fashion.

However, the techniques of caching that are commonly deployed in the current Internet do not work well with a large portion of web-accessible content. Data that is personalized to a client, or data that is generated by invocation of programs like cgi-bin scripts or servlets can not be readily cached at the proxies. For a server offering electronic services over the Internet, non-static data forms a significant portion of their overall data content. It would be advantageous to have a scheme whereby such dynamically generated content, and web-centric applications can also benefit from the presence of proxies.

As in the case of caching of static data, it is highly desirable that the caching of applications be done so that the administrative and operation control of the data/application resides with the original server, rather than with at the proxy server. A solution is needed which accelerates applications while still providing the administrative control of the application to the original server, rather than the proxy server.

SUMMARY OF THE INVENTION

Accordingly, an aspect of the present invention presents methods and apparatus by which to accelerate execution of Web front-ended applications by means of executing them at proxies located closer to the client browsers.

Another aspect of the present invention presents methods and apparatus for a proxy server which provides an execution environment for acceleration of Web front-ended applications.

Another aspect of the present invention presents methods and apparatus for a backend server which provides an execution environment for acceleration of Web front-ended applications.

BRIEF DESCRIPTION OF THE DRAWINGS

These and other aspects, objects, features, and advantages of the present invention will become apparent upon further consideration of the following detailed description of the invention when read in conjunction with the drawing figures, in which.

DETAILED DESCRIPTION OF THE INVENTION

Figure 1:
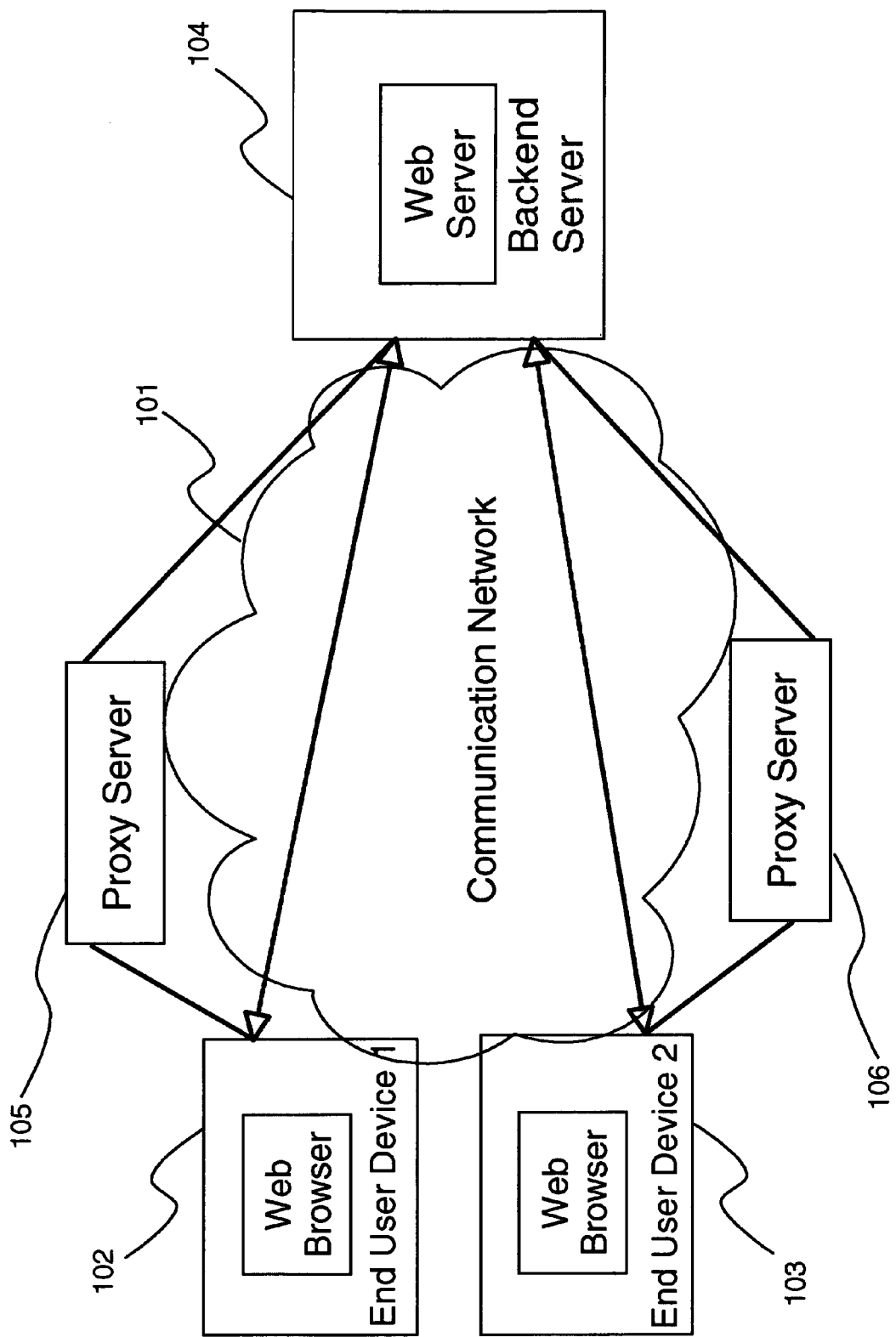
FIG. 1 is a block diagram showing an example of an application acceleration infrastructure, and their manner of interaction in accordance with the present invention.

FIG. 1 shows an example of the components of an application acceleration infrastructure. A communication network 101 is used to interconnect client devices containing Web-browsers like 102 and 103 to a backend web server 104 that provides Web-based applications. Major portions of the application code are moved onto proxy servers like 105 and 106 that are in closer proximity to the respective end client devices. Communications is maintained between the proxy servers 105 and 106 and the backend server 104 so that the backend server can continue to exercise administrative control over the distributed portions of the applications code. Communications is also maintained between the end client devices 102 and 103 and the backend server 104 so that the latter can continue to provide applications services that are not readily distributable.

Figure 2:
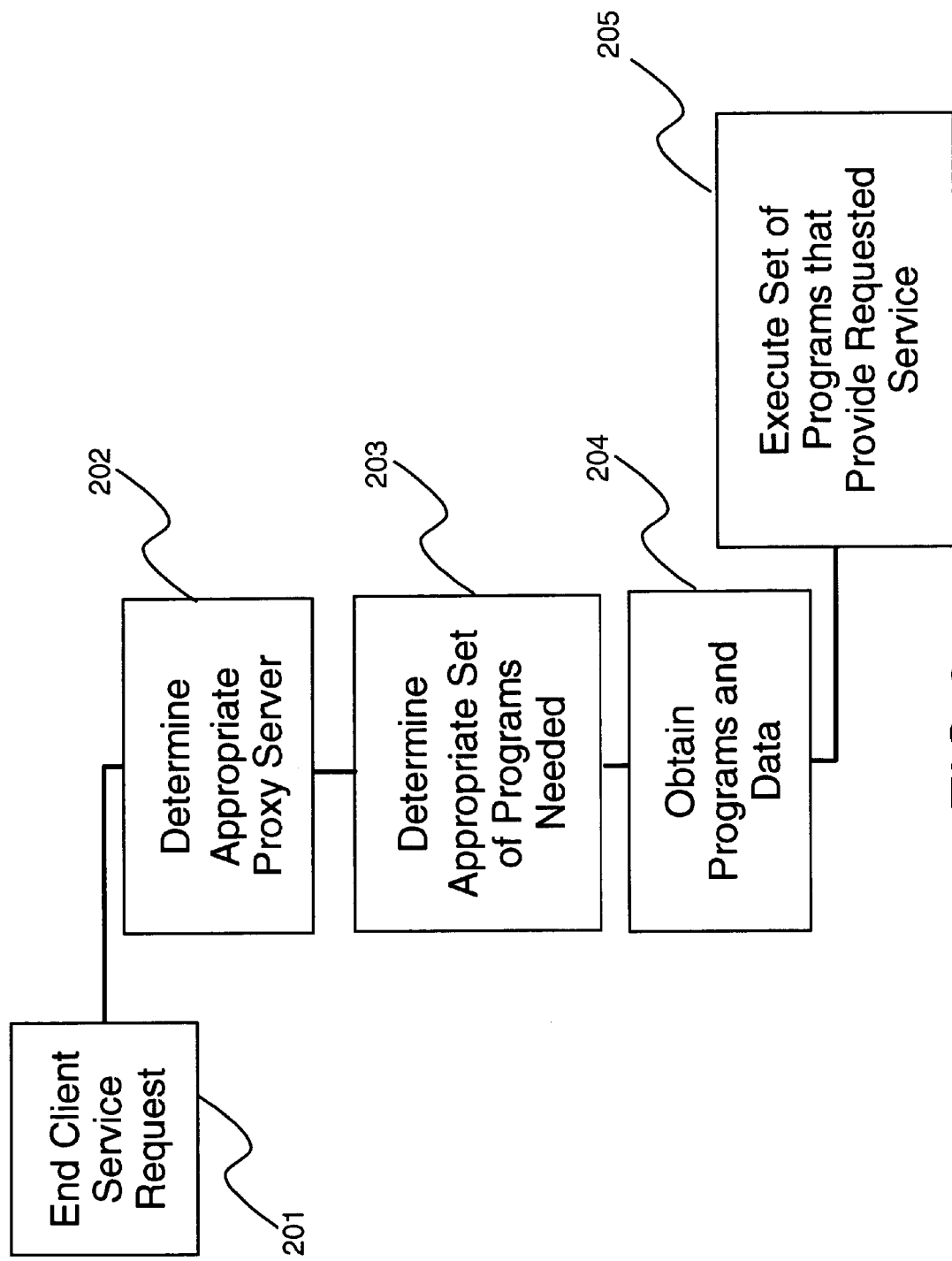
FIG. 2 is a block diagram of an example showing steps for a method of application acceleration in accordance with the present invention.

FIG. 2 delineates the steps that comprise a method of application acceleration. In response to a client service request 201, a Wide Area Load Balancing module determines the appropriate proxy server to which to direct the request based upon current network performance characteristics and the location of the end client client device as in 202. The proxy server then determines the set of programs that it needs to run in order to satisfy the end client request as in 203. These may be already resident at the proxy server if they had been needed to satisfy previous requests from other users, or if they had been deployed to the proxy server in anticipation of end client requests for basic or popular applications. In any of these cases, they are resident at the backend server. The proxy server obtains the data and application code appropriate for fulfilling the service request as in 204, and executes the indicated functions for the end client on behalf of the backend server as in 205.

Figure 3:
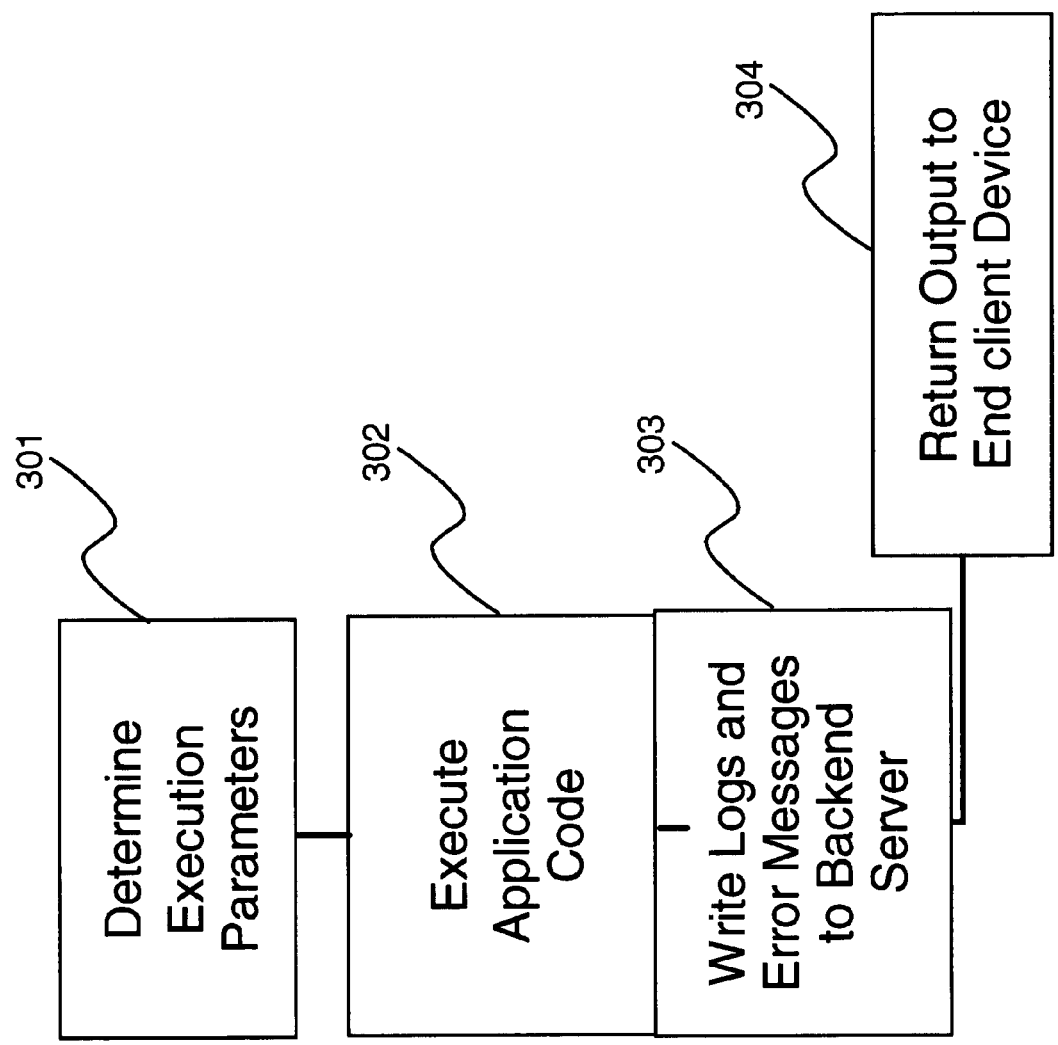
FIG. 3 is a block diagram of an example showing steps taken by a proxy server in executing a requested service for an end client in accordance with the present invention.

FIG. 3 is a block diagram that shows an example of steps taken by a proxy server in executing a requested service for an end client. The response from an application is often tailored to a particular end client or class of end users, depending upon organizational affiliations or other criteria. The proxy server thus obtains information from the backend server regarding which execution parameters to employ in satisfying this specific end client request as in 301. The application logic is then executed as in 302, and any administrative information or error messages resulting from the application execution are logged and sent to the backend server as in 303. In order to simplify systems management and provide support for problem tracking and diagnosis, the backend server maintains responsibility for the application logic. This allows the proxies to be shared effectively by many back end servers without increasing their complexity. The results of the execution of the application logic are then sent to the end client as in 304.

Figure 4:
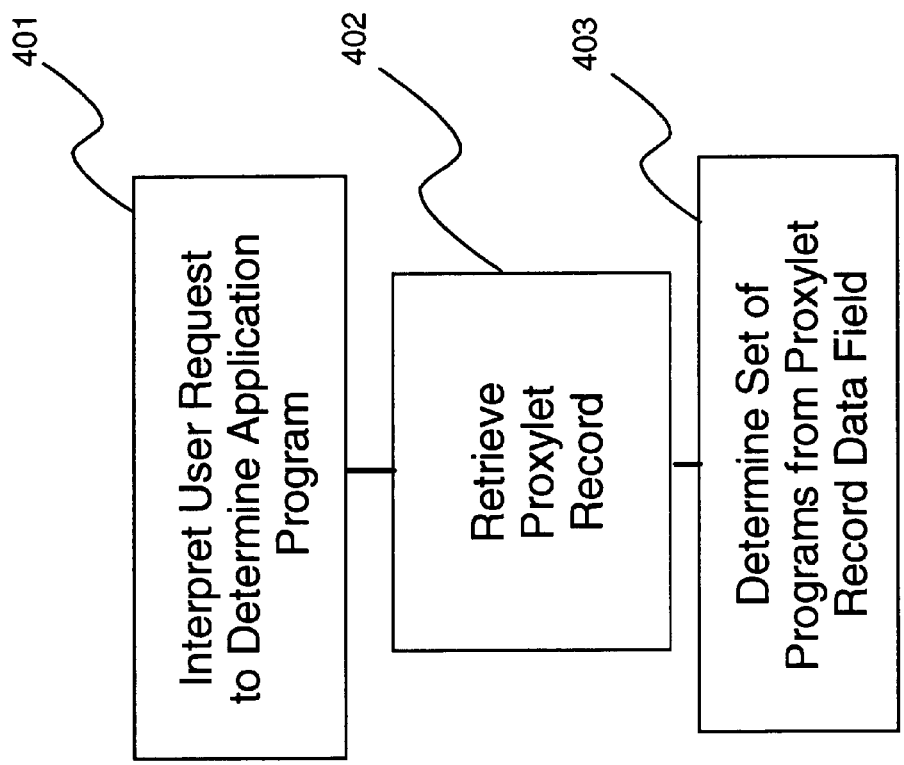
FIG. 4 is a block diagram of an example showing steps for determination of an appropriate set of programs to run in response to a particular end client service request in accordance with the present invention.

FIG. 4 is a block diagram of steps for a determination of an appropriate set of programs to run in response to a particular end client service request. The request indicates a target location within the backend server for the application logic, typically in the form of a Uniform Resource Locator (URL). The proxy server maintains data on application programs that it represents, and determines what service is being requested as in 401. The appropriate proxylet record is then retrieved as in 402. The proxylet record contains a data field specifying the set of programs needed in order to properly satisfy an end client service request, and this is read by the proxy server as in 403.

Figure 5:
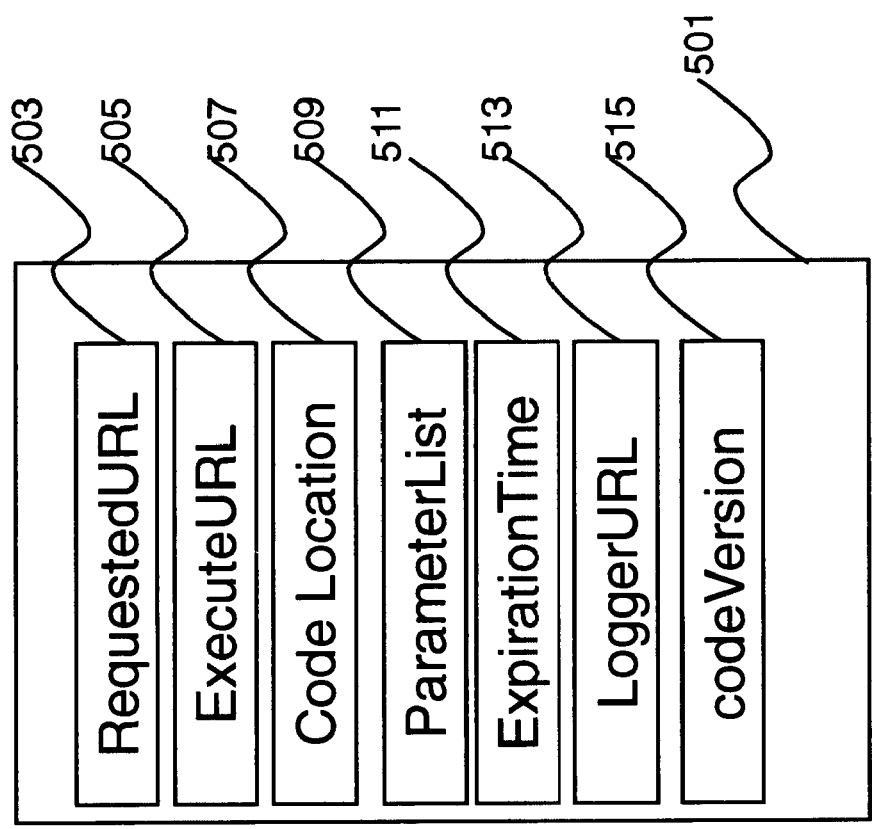
FIG. 5 is a block diagram of an example showing structure of an information record, used in a solution to the distributed application acceleration problem in accordance with the present invention.

FIG. 5 shows the structure of a proxylet record used in order to determine the set of programs that are to be executed at a proxy when a request is received from a client. The proxylet record 501 includes several fields. The RequestedURL field 503 contains the URL which the client was requesting. The ExecuteURL field 505 contains the name of a URL which will be executed at the local proxy in order to support this request. The location where the compute code required to run ExecuteURL is contained in the field CodeLocation 507. The ParameterList field 509 contains any parameters which would be passed to the program in order for it to be executed. The contents of the ParameterList field 509 may be same for different proxies within the network, or they may be different for multiple proxy servers. The ExpirationTime field 511 contains the date until which this proxylet record may be considered valid. Once the time specified by field 511 has expired, a proxy server would need to retrieve a new proxylet-record from the backend server. The LoggerURL field 513 identifies a location where the error messages and diagnostic output of the proxylet are provided. Typically, the loggerURL would identify a location on the backend server. The codeversion field 515 contains the time when the program set identified in the field codeLocation 505 was last modified. Other fields may also be included within the proxylet-record as used in different embodiments of the invention.

As an example, let us consider a request from a client which is targeted to the location http://main-server.com/servlet/program1.

This request is delivered to the proxy server running at the machine proxy-server.com. The proxylet record for this request might contain the fields of requestedURL field being http://main-server.com/servlet/program1, with executeURL field being/servlet/proxy-program1, the codeLocation field being http://main-server.com/proxylet/prox-program1, the ParameterList being empty, and the LoggerURL being http://main-server.com/servlet/logger, the expirationTime field being 30000 seconds after a reference date such as Jan. 1, 1970, and the codeversion field being 29500 seconds after a reference date such as Jan 1, 1970. When such a request is received at the machine proxy-server.com, the machine checks if it has a cached entry corresponding to the proxylet-record where the requestedURL matches the request being received. If it does, it checks the expirationTime field to ensure that the record needs to be updated. It then checks to see if it has the program identified by the executeURL installed locally at the proxy-server. If it does, then it runs the program passing to it any parameters contained in the parameterList field. If the proxylet-record is not found, or if the current time is greater than the time specified in the expirationTime field, the proxy-server contacts the main-server to obtain a fresh copy of the proxylet-record prior to executing the steps outlined above.

Figure 6:
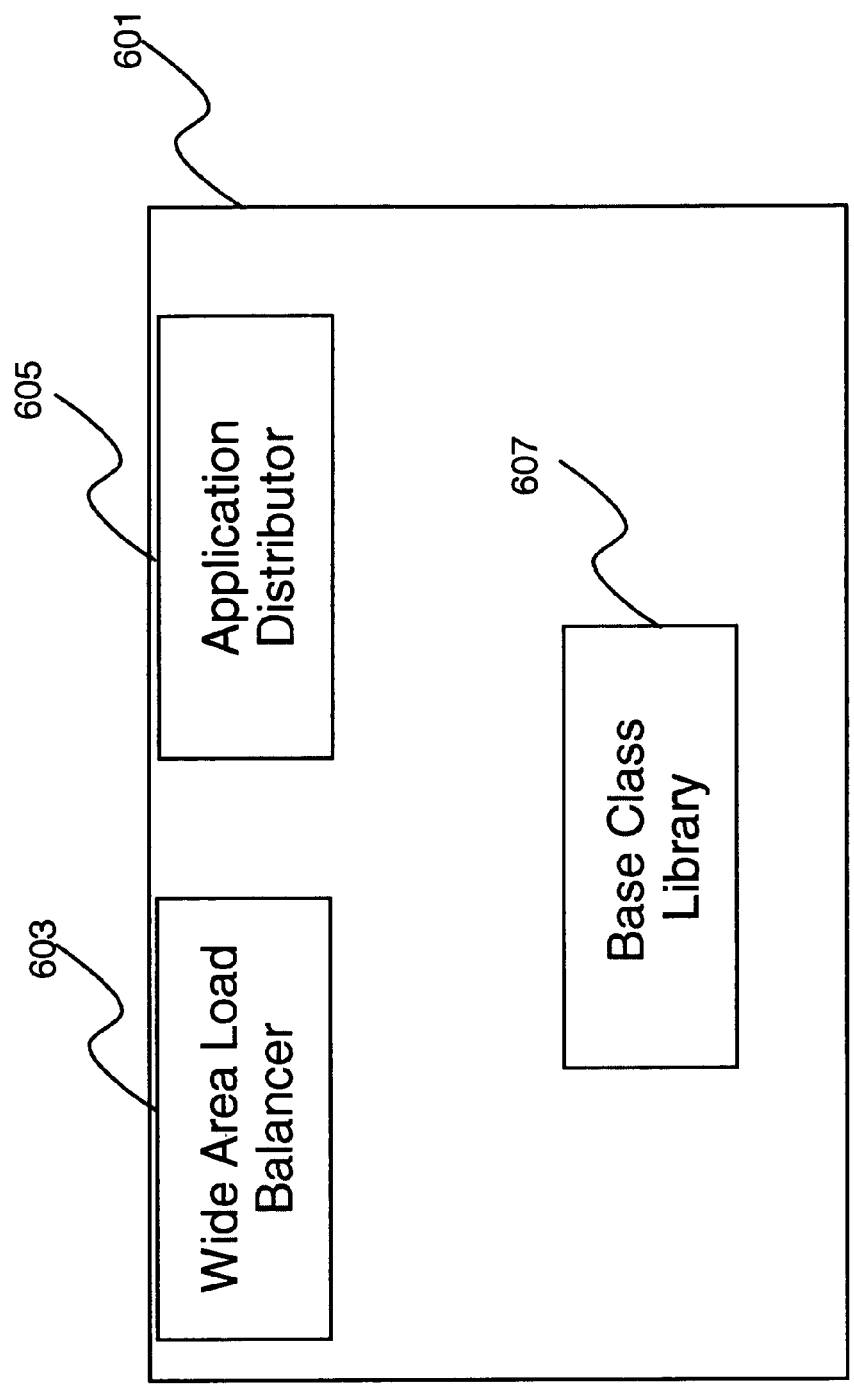
FIG. 6 is a block diagram showing an example of a structure of a distributed system to implement a solution to the distributed application acceleration problem in accordance with the present invention.

The schemes as described above can be seen as a distributed system that achieves acceleration of applications by distributing their execution. An apparatus 601 that implements the distributed system is shown in FIG. 6. FIG. 6 includes three distributed components, a wide-area load balancer 603, a application distributor 605, and a base class library 607. The wide area load-balancer 605 is a distributed module which collects performance statistics about the network, and determines the most appropriate place where a request should be sent out to. Since these components are distributed components, the connectivity information among them is not shown in the Figure. However, the connectivity information will become clearer from the description provided below.

The Wide Area Load Balancer 603 is a component responsible for distributing client requests to different proxy servers within the network. It can be implemented in a variety of manners. One common way to implement it is by means of a modified domain name server. The domain name server, usually abbreviated to DNS server, is the application in the network responsible for mapping machine names to IP addresses. A modified domain name server can return an IP address which corresponds to an appropriate proxy server when a client requests an address for the backend server. The appropriate proxy server is determined on the basis of the current network performance characteristics and the location of the client.

An alternative implementation of the wide area load balancer includes a module within the backend server that is responsible for redirecting requests to the appropriate proxy server. Such a redirection module might be implemented as a plug-in module among a variety of web-servers such as Apache, NetScape or Microsoft IIS server, which are commonly in use in the industry. The module would look at a table of redirection rules, which specify how requests coming from specific client IP addresses should be dispatched, and use this information to determine the appropriate proxy-server to which the request should be dispatched. The selection of the proxy-server can be based on other criteria included in the rule, e.g. The resource (URL) being requested by the client, or a cookie which is contained within the client's request.

Another embodiment of the wide area load balancer uses a stand-alone http server which provides the same functionality as that of the module described above. The http server implements the ability to direct requests to proxy-servers, or to another server operation locally at the site with the stand-alone http server, which services requests that need to be performed locally.

The application distributor 605 is responsible for ensuring that the set of programs that need to be executed at the proxy server are indeed available at that server. There are many embodiments of such an application distributor which will be useful to those skilled in the art.

One useful embodiment of an application distributor uses a program which keeps track of all the programs and data that is available at a main-server, and maintains a replica of those program and data at the proxy server. Such an distributor will push the changes that occur at the main-server out to the proxy servers in order to maintain this consistency of program and data.

Another embodiment of an application distributor uses a program that runs at the proxy-server and caches a copy of programs and data from the main-server when requests that would cause execution of those programs are received at the proxy-server. The data that the programs need to execute is also retrieved as needed, and cached at the proxy-server. The programs and data are both cached on demand.

Yet another embodiment of an application distributor uses a program that employs both of these techniques. Some of the programs which are most often used are pushed out to all of the proxy-servers while other programs are cached on demand at the proxy-server.

The class library 607 is a set of programs that exists at all the proxy-servers and the backend servers. It contains a collection of classes that enable many functions to occur. One of the classes contained in the library identifies the set of programs that are capable of executing at the proxy-server. All such programs are derived from a specific class proxylet, and the fact that these programs are subclassed from the class proxylet is used to validate that the program can execute at the proxy-server. Yet another class provided in the class library is the Logger class, which allows the output and error messages generated by the program executing at the proxy-server to be copied to the main-server for purposes of logging and diagnostics. Yet other set of classes allow for the caching of different types of application data. Instances of these include the programs for caching queries made to a directory or a database, programs for caching records in a database, as well as programs for caching files.

Figure 7:
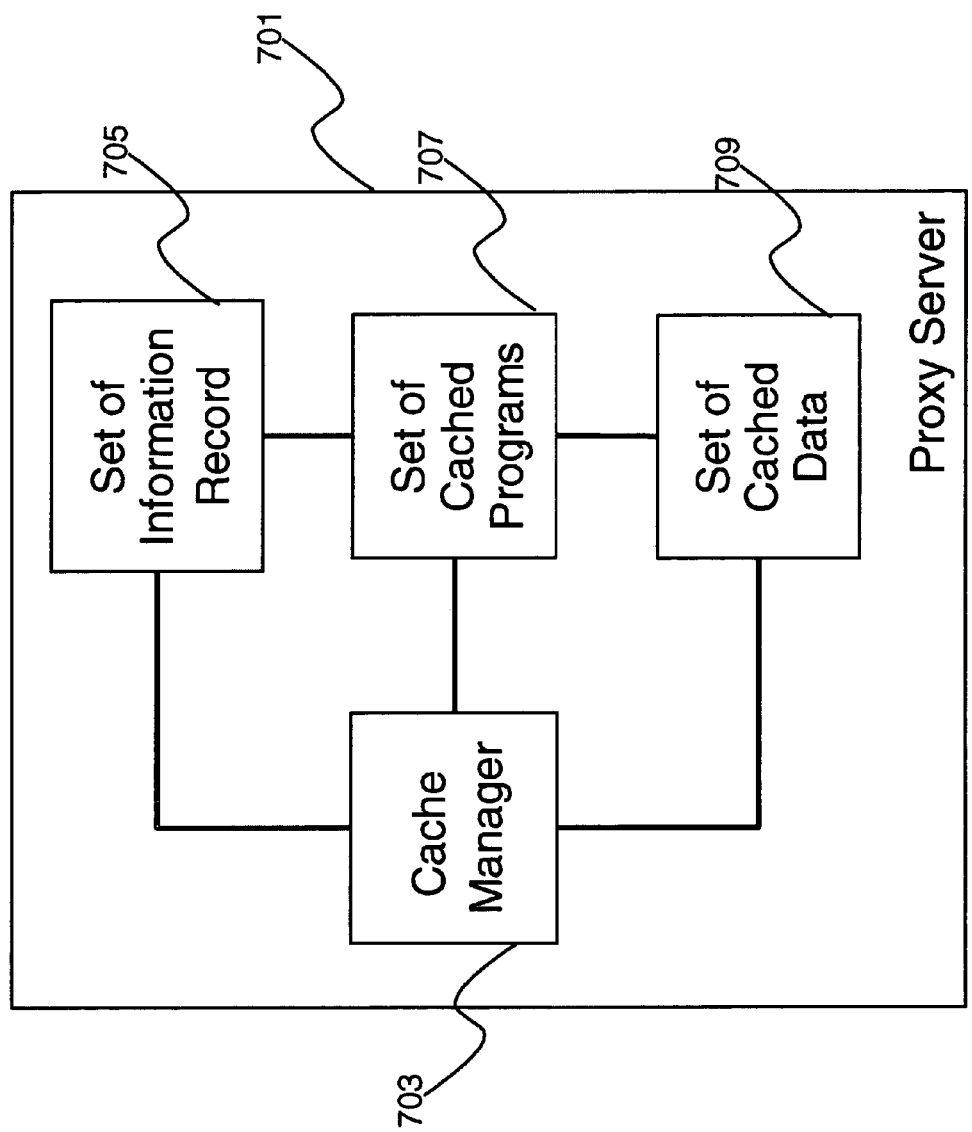
FIG. 7 is a block diagram showing an example of a structure of a proxy server, used in a solution to the distributed application acceleration problem in accordance with the present invention; and, FIG. 8 is a block diagram showing an example of a structure of a backend server, used in a solution to the distributed application acceleration problem in accordance with the present invention.

The components of the distributed architecture shown in FIG. 6 are various proxy-servers and the backend server. A proxy-server which is such a component in this solution is shown in FIG. 7. The proxy-server 701 includes a Cache Manager 703, a set of cached information records 705, a set of cached programs 707, and a set of cached data 709. The Cache Manager 703 is responsible for managing and updating the different types of caches, namely the set of cached information records 705, the set of cached programs 707 and the set of cached data 709. The cache manager maintains all of these caches in an appropriate manner. The set of cached information records 705 contains information about the cached programs that are cached locally in the set of cached programs 707. The format of information contained in the information record is similar to that of the proxylet record 501 shown in FIG. 5. The Cache Manager 703 utilizes the services of an application distribution module 605 in order to ensure the consistency and coherence of the different sets of caches. The set of cached data programs 709 is maintained current by using data caching techniques that are well-known to those versed in the art.

Figure 8:
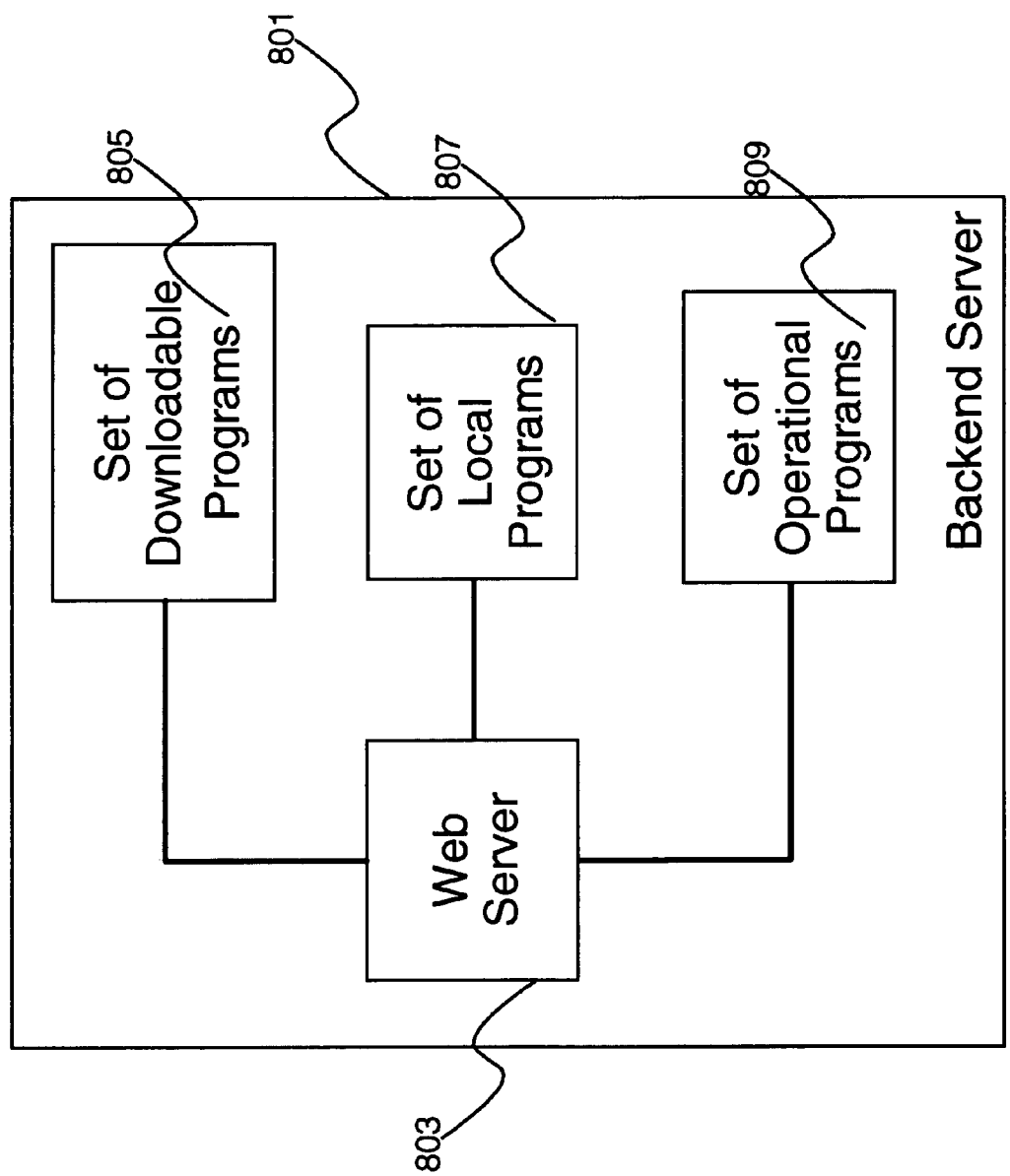

FIG. 8 shows the structure of a backend server which would respond to the proxy server shown in FIG. 7 and provides the other part of the infrastructure for application acceleration. The backend server 801 includes a traditional web-server 803, a set of programs to be downloaded to proxy servers 805, a set of local programs 807, and a set of operational programs 809. The web-server 803 provides the means by which a proxy server can gain access to the set of programs 803, 805 and 807. The set of downloadable programs 803 are transferred to a proxy server if it makes a request for them. All or a subset of the programs may be transferred to the proxy server. The set of local programs 807 provides a means by which a proxy server can execute some parts of the processing at the backend server itself. As an example, a proxy server may want to execute programs related to updating databases only at the backend server. The set of operational programs 809 provides a means by which a proxy-server can provide diagnostics and management information to the backend server. An example of an operational program 809 would be a logger servlet that can obtain logging messages generated by programs executing at the proxy server.

In some embodiments of the backend server, the web-server may incorporate an ability to redirect client requests to other servers. This would be an instance of the application distribution module. In other embodiments, the backend server may rely upon the domain name service to do such redirections. The backend server as described in FIG. 8 and a set of proxy servers as described in FIG. 7 together provide the infrastructure for distributed application acceleration.

It is noted that the present invention can be realized in hardware, software, or a combination of hardware and software. A tool according to the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software uses a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context includes any expression, in any language, code or notation, of a set of instructions intended to cause a system having an information processing capability to perform a particular function either directly or after either conversion to another language, code or notation; and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new and desire to secure by Letters Patent is as follows:

1. A method for distributing at least one application in a communication network, said method comprising the steps of:
   redirecting to one server of a plurality of proxy servers at locations distributed throughout the network, at least one service request received from a client for said at least one application;
   determining a set of programs required at said one server to fulfil said request for said at least one application, the determining including parsing the request to determine the programs required to satisfy the request;
   retrieving a proxylet-record for said programs;
   looking up a field of said proxylet-record for determining the set of programs to be executed at the proxy server;
   executing said set of programs; and
   providing administrative control of said application with a backend server.

2. A method as recited in claim 1, further comprising examining a cache of programs to obtain the set of programs.

3. A method as recited in claim 2, wherein said cache is located at another server of said plurality of proxy servers.

4. A method as recited in claim 2, further comprising returning the results of the step of executing to the client.

5. A method as recited in claim 1, further comprising forwarding a portion of the request that needs to be satisfied at another server to said another server.

6. A method as recited in claim 5, wherein said another server is said backend server.

7. A method as recited in claim 1, wherein the step of executing includes:
   obtaining parameters for execution from said backend server; and
   writing any resulting logging and error messages to said backend server.

8. A method as recited in claim 2, where the step of examining includes:
   employing a local store in determining a first set of programs present at a first proxy server; and
   downloading a second set of programs from another server for said second set of programs not present at said first proxy server.

9. A method as recited in claim 1, where the step of redirecting is based upon a-priori knowledge of location of said set of programs.

10. A method as recited in claim 9, wherein said a-priori knowledge is deployed at a domain name server.

11. A method as recited in claim 9, wherein said a-priori knowledge is deployed at said backend server.

12. A method as recited in claim 1, further comprising storing at least a portion of said programs on each of said proxy servers.

13. A method as recited in claim 1, wherein said backend server is in communication with each of said proxy servers for administrative control of each of said proxy servers.

14. A method as recited in claim 1, further comprising providing said backend server in communication with said client for providing services for portions of said application that are not readily distributable to said proxy servers.

15. A method as recited in claim 1, wherein the proxylet-record comprises at least one of the following:
   a requested URL field for the URL that the client was requesting;
   an execute URL field for a name of a URL which will be executed at a local proxy;
   a code location field for containing a location for code required to run a URL which will be executed at the local proxy;
   a parameter list field for any parameters which are passed to the program in order for the program to be executed;
   an expiration time field for a date until which the proxylet-record may be considered valid;
   a logger URL field for identifying a location where error messages and diagnostic output of the proxylet are provided; and
   a code version field for containing the time when the program set identified in the code location field was last modified.

16. A method as recited in claim 15, wherein contents of the parameter list field are different for different proxy servers within the network.

17. A method as recited in claim 15, wherein when a time specified by the expiration time field has expired, a proxy server retrieves a new proxylet-record from a backend server.

18. A method as recited in claim 15, wherein the logger URL identifies a location on a backend server.

19. A method as recited in claim 1, whereby latency in said communication network is reduced.

20. A method as recited in claim 1, wherein dynamically generated content is cached at the proxy servers.

21. A program storage device readable by machine, tangibly embodying a program of instructions executable by the machine to perform method steps for distributing at least one application in a communication network, said method comprising the steps of claim 1.

22. An apparatus to accelerate a distributed application within a network, the apparatus comprising:
   a wide area load balancer for distributing at least one request from at least one client to a particular proxy server from among a plurality of proxy servers distributed throughout the network;
   an application distributor for distributing a set of programs used for said distributed application to at least said particular proxy server necessary to satisfy said at least one request;
   an information-management recorder for recording connectivity information about the set of programs;
   an execution device for obtaining parameters specific to said request and for obtaining and executing said set of programs satisfying said at least one request at said particular proxy server, said execution device performing at least one operation to satisfy said request and writing any resulting logging messages;

a backend server for providing administrative control of said application, and for receiving said logging messages.

23. An apparatus as recited in claim 22, further comprising a request forwarder for forwarding to another server any portions of said at least one request which have to be executed at said another server.

24. An apparatus as recited in claim 22, wherein said application distributor distributes at least a portion of said programs to each of said proxy servers.

25. An apparatus as recited in claim 22, wherein said backend server is in communication with each of said proxy servers for administrative control of each of said proxy servers.

26. An apparatus as recited in claim 22, wherein said backend server is in communication with said client for providing services for portions of said application that are not readily distributable to said proxy servers.

27. An apparatus for distributing at least one application in a communication network, comprising:

a plurality of proxy servers each having:
a first set of programs used in said at least one application, a second set of programs retrieved from a back-end server and executed locally to satisfy part of at least one request received from a client;
a set of cached data associated with said sets of programs;
a set of information-management records for said sets of programs; and
a cache manager for maintaining the set of programs, the set of cached data and the set of information-management records in distribution of said at least one application;
an execution device for obtaining parameters specific to said request and for obtaining and executing said set of programs satisfying said at least one request, said execution device performing at least one operation to satisfy said request and writing any resulting logging messages;
said backend server providing administrative control of said application, and receiving said logging messages.

28. An apparatus for distributing at least one application in a communication network, said apparatus comprising a backend server having:
a first set of programs used for said at least one application, said first set of programs being distributed to a plurality of proxy servers within the network, each proxy server having an execution device for obtaining parameters specific to a request and for obtaining and executing said set of programs satisfying said request, said execution device performing at least one operation to satisfy said request and writing any resulting logging messages;
a second set of programs used for said at least one application, said second set of programs being executed locally by the backend server;
a third set of programs used for said at least one application, said third set of programs to receive logging and error messages from the execution of said first set of programs;
an accessing server to provide access to the first set of programs by any of the proxy servers;
said backend server providing administrative control of said application.

29. An apparatus as described in claim 28, further comprising a request redirector for redirecting requests to one of the plurality of proxy servers.

30. An article of manufacture comprising a computer usable medium having computer readable program code means embodied therein for causing application distribution in a network with a plurality of machines, the computer readable program code means in said article of manufacture comprising computer readable program code means for causing a computer to effect the steps of claim 1.

31. A method for distributing at least one application, said method comprising:
redirecting one client for said at least one application, to a first proxy server from a plurality of proxy servers distributed throughout a network;
evaluating a request for said at least one application to determine a part of said application that is executable at the first proxy server;
obtaining values of parameters specific to said request;
executing said part at said proxy server;
obtaining at least one program used by said at least one application enabling said step of executing;
wherein the step of executing includes:
performing at least one operation to satisfy said request; and
writing any resulting logging messages to a backend server; and
providing administrative control of said application with a backend server.

32. A method as recited in claim 31, further comprising determining a location of said at least one program.

33. A method as recited in claim 31, wherein said backend server manages said at least one program.

34. A method as recited in claim 32, wherein said location is the location of a second proxy server.

35. A method as recited in claim 32, wherein the step of determining includes:
obtaining a proxylet-record for said request; and
looking up at least one field in the proxylet-record.

36. A method as recited in claim 35, wherein the proxylet-record comprises at least one of the following:
a requested URL field for the URL that the client was requesting;
an execute URL field for a name of a URL which will be executed at a local proxy;
a code location field for containing a location for code required to run a URL which will be executed at the local proxy;
a parameter list field for any parameters which are passed to the program in order for the program to be executed;
an expiration time field for a date until which the proxylet-record may be considered valid;
a logger URL field for identifying a location where error messages and diagnostic output of the proxylet are provided; and
a code version field for containing the time when the program set identified in the code location field was last modified.

37. A method as recited in claim 31, wherein the step of obtaining includes:
obtaining a proxylet-record for said request; and
looking up at least one field in the proxylet-record.

38. A method as recited in claim 31, further comprising redirecting a second request from said client to a second proxy server.

39. A method as recited in claim 31, further comprising redirecting a second request received from a second client to said first proxy server.

40. A method as recited in claim 31, further comprising redirecting a second request received from a second client to a second proxy server.

41. A method as recited in claim 31, further comprising storing at least a portion of said programs on each of said proxy servers.

42. A method as recited in claim 31, further comprising providing a backend server in communication with each of said proxy servers for administrative control of each of said proxy servers.

43. A method as recited in claim 31, wherein said backend server is in communication with said client for providing services for portions of said application that are not readily distributable to said proxy servers.

44. An article of manufacture comprising a computer usable medium having computer readable program code means embodied therein for causing application distribution in a network with a plurality of machines, the computer readable program code means in said article of manufacture comprising computer readable program code means for causing a computer to effect the steps of claim 31.

45. A program storage device readable by machine, tangibly embodying a program of instructions executable by the machine to perform method steps for distributing at least one application in a communication network, said method comprising the steps of claim 31.

* * * * *